United States Patent [19]

Knipe et al.

[11] Patent Number: 5,012,393
[45] Date of Patent: Apr. 30, 1991

[54] BASE FOR BOTTLE LAMP

[76] Inventors: Earl A. Knipe, R.R. Box 58, Warsaw, Ill. 62379; Jan B. Knipe, Box 131A, Fowler, Ill. 62338

[21] Appl. No.: 562,012

[22] Filed: Aug. 2, 1990

[51] Int. Cl.⁵ .............................................. F21L 19/00
[52] U.S. Cl. ..................................... 362/163; 362/181; 362/316; 362/253; 248/313; 225/96; 431/291
[58] Field of Search ............... 362/161, 163, 174, 312, 362/314, 316, 445, 806, 253, 388, 457, 313, 159, 315, 172, 180, 181; 431/291; 248/313, 916; 225/94, 96; 83/886, 879; 403/4

[56] References Cited

U.S. PATENT DOCUMENTS

| | | | |
|---|---|---|---|
| 666,167 | 12/1900 | Moegling | 431/291 |
| 964,841 | 7/1910 | Bernau | 362/161 |
| 3,572,564 | 3/1971 | Fleming | 225/96 |
| 3,699,829 | 10/1972 | Gelfman | 225/96 |
| 3,744,692 | 7/1973 | Dogel | 225/96 |
| 4,184,195 | 1/1980 | Duncan | 362/163 |

Primary Examiner—Stephen F. Husar
Assistant Examiner—D. M. Cox
Attorney, Agent, or Firm—Joseph W. Holloway

[57] ABSTRACT

A candle lamp includes a chimney base incorporating a projecting glass cutting wheel against which an operator may press and rotate a glass bottle to score the same for subsequent parting of the bottle into a chimney for the lamp. The base is movable relative to the bottle for vertical and angular adjustment of the wheel; and, the base provides a steadyrest for the bottle as it is rotated. Spring clips project from the top of the base in supporting engagement with the chimney.

17 Claims, 3 Drawing Sheets

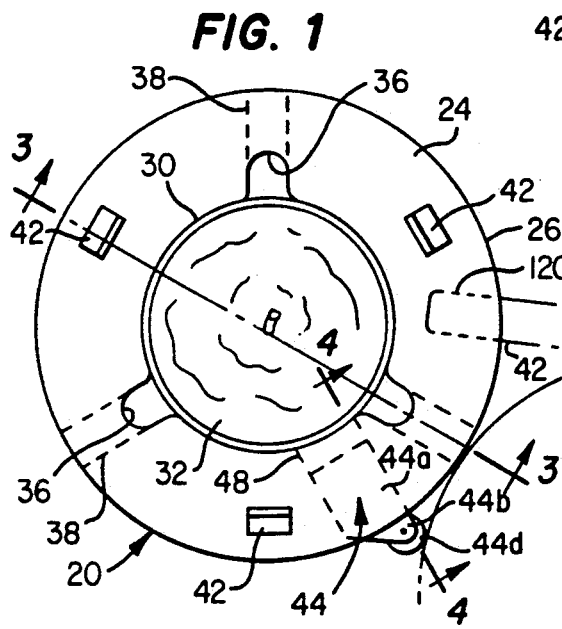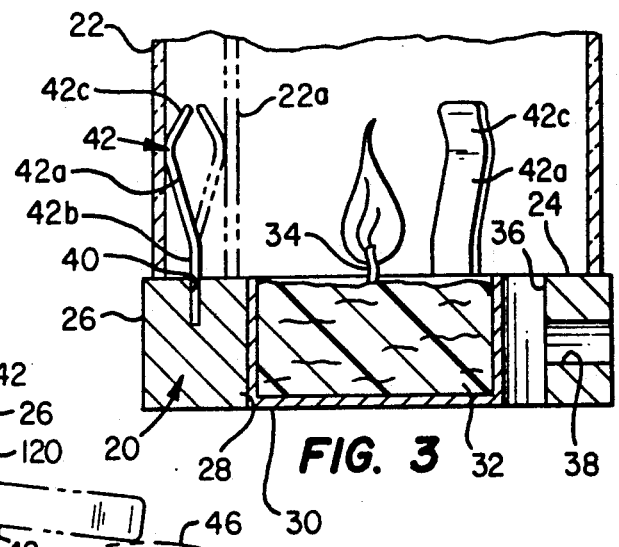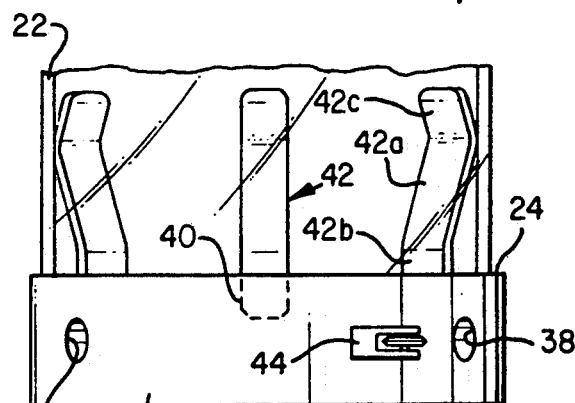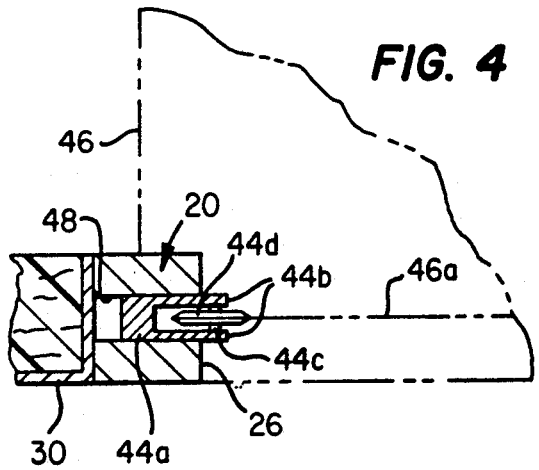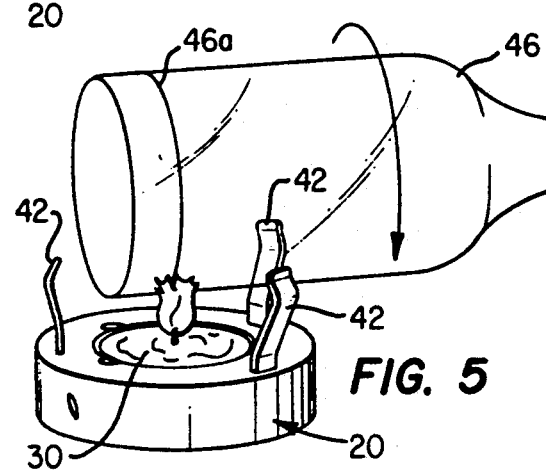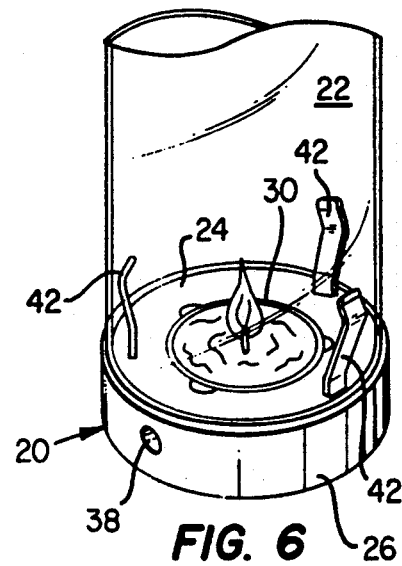

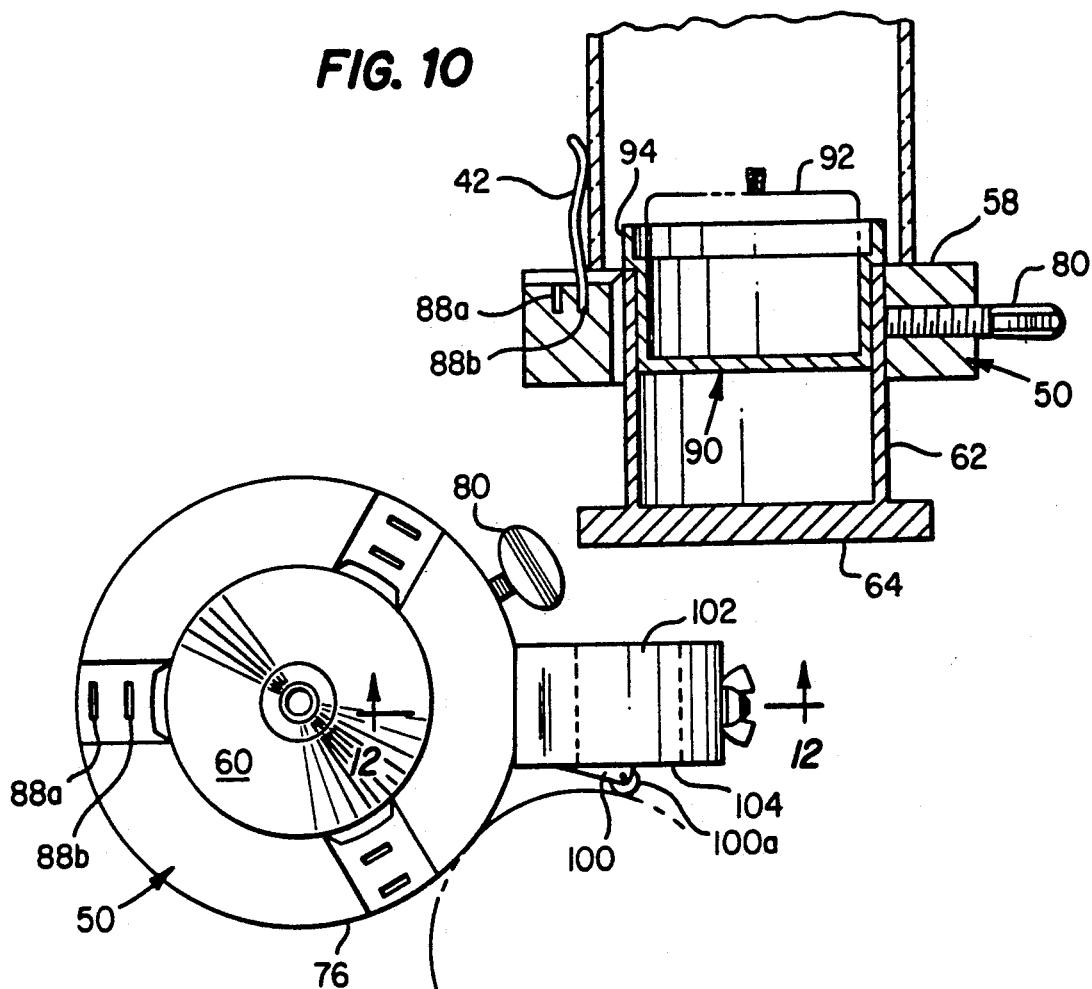
FIG. 10
FIG. 11
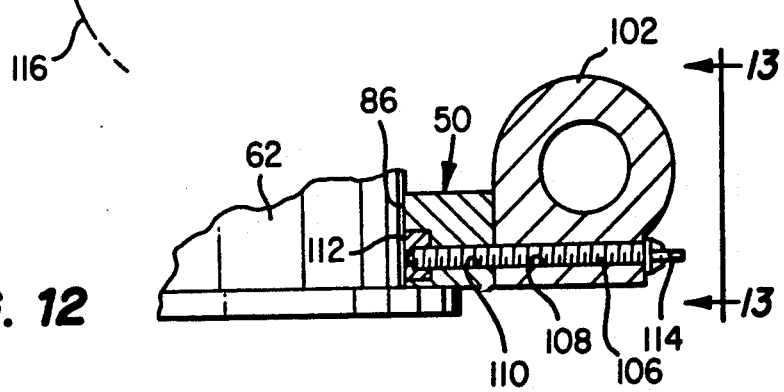
FIG. 12
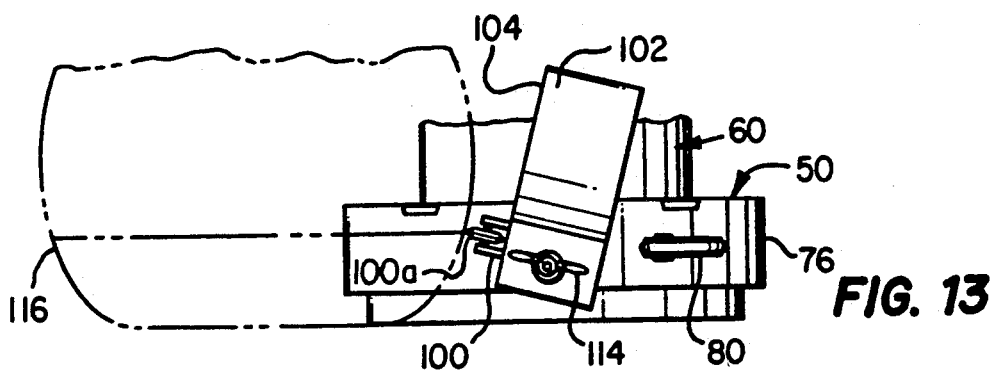
FIG. 13

BASE FOR BOTTLE LAMP

BACKGROUND OF THE INVENTION

This invention generally pertains to lamps having a base which supports a light source such as a candle and having a transparent or translucent chimney which is also supported on the base in surrounding relationship with the light source. One such lamp is shown in U.S. Pat. No. 2,241,698 issued to Brady. This lamp includes a base which provides a candle socket and a conventional glass chimney seated on the base.

The use of a modified glass bottle as a chimney for a lamp of the type disclosed herein is old and well-known. One such bottle chimney is shown in U.S. Pat. No. 4,184,195 issued to Duncan. A bottle chimney may have its closed lower end removed so that the bottle can be placed over the light source in the manner of a conventional open-bottomed chimney.

The use of discarded glass beverage containers for spirits, wine, beer, soda and the like as the chimney component of a lamp has been enthusiastically accepted by hobbyists, craftpersons and environmentalists; however, fabrication of such bottle chimneys remains a problem. Most hobbyists and craftpersons do not have the proper equipment and expertise to score and break away a portion of a brittle glass bottle without risk of uneven severence of the glass or of shattering the glass with attendant risk of personal injury.

Since effective scoring of a cylindrical glass surface by free hand means is difficult, if not impossible, prior art apparatus for scoring and parting hollow glass articles such as bottles and tubes commonly employ a mechanical fixture for positioning and guiding a cutter wheel relative to the article to be cut. Examples of such apparatus used specifically to sever bottles are disclosed in U.S. Pat. No. 3,572,564 to Fleming; U.S. Pat. No. 3,744,359 to Gelfman; and U.S. Pat. No. 3,744,692 to Doyel. Each of these prior art devices is mechanically complex and is, therefore, expensive to manufacture. Moreover, use of these devices requires levels of know-how and manipulative skills beyond those possessed by most hobbyists and non-commercial craftpersons. Furthermore, if a bottle cutting apparatus is used infrequently for fabricating only a limited number of bottle chimneys, purchase of such expensive apparatus would not be economically justifiable. Therefore, in order to meet the minimal requirements as an acceptable hobby or craft-type cutting device for bottle chimneys, the device should be of low cost, easy to operate and otherwise well adapted for casual users of such a device.

It is also essential that a glass cutting device of this desired character be able to perform these additional operations as do its more complex and costly prior art counterparts, namely:

1. Provide a fixture-like support for the bottle as it is rotated against a cutter wheel;
2. Provide for scoring a bottle at selectable locations along the length of the bottle; and,
3. Display angular adjustability of the cutter so that curved and sloped bottle surfaces can be incised at right angles.

The aforenoted prior art devices fail to recognize the desirability of a bottle cutter compact enough to be included in a prepackaged assemblage which could be sold to crafters as a complete, off-the-shelf kit for fabricating bottle lamps. While a relatively small conventional glass cutter of the type used to score flat glass could be included in such a kit, these handheld cutters, as noted above, are not practical for scoring the external wall of a typical beverage bottle.

The prior art altogether fails to appreciate the advantages of a multi-purpose bottle lamp base, according to this invention, which is effective for scoring and parting glass bottles of various shapes, for supporting bottle chimneys of various sizes and for housing various light sources.

SUMMARY OF THE INVENTION

Accordingly, it is the general object of this invention to provide a novel base for a bottle lamp which is structurally and operationally adapted to obviate the aforedescribed shortcomings of prior art devices intended for a similar purpose.

A principal object is to provide a base for a bottle chimney which also functions as a fixture or support for a glass cutting wheel. To this end, this invention contemplates a base which carries a laterally projecting cutter wheel against which a bottle surface may be pressed and rotated for scoring the outer surface thereof. Various embodiments of the base disclosed herein are adapted for raising and lowering the cutter wheel whereby the bottle wall may be scored at a selected point along its length and for tilting the cutter wheel whereby a sloped or curved side wall of the bottle may be scored at right angles thereto.

Another object is the provision of a bottle chimney base which includes a radially projecting handle grip for engaging and steadying the bottle being scored by a cutter blade extending from the base. Alternatively, the cutter blade may be carried by the handle in which case the base itself serves as a steadyrest as the bottle is rotated for scoring. In another embodiment of this invention, the handle carries the cutter blade; and, the handle is adjustable relative to the base in order to angulate the blade for perpendicular engagement with curved or sloped bottle surfaces.

Still another object is the provision of a bottle chimney base having a recess or aperture for receiving a candle or a hollow container for a supply of lamp fuel. The fuel container may comprise a sub-base about which the base is vertically movable whereby the cutter blade is vertically adjustable for cutting a bottle at a selectable point along its length. The fuel container may have a wick-supporting closure head which can be replaced, as desired, by a cup-like candle support.

Yet another object of this invention is the provision of clips which fit into angularly and radially spaced slots in the upper surface of a cylindrical base and which project above the base in supporting engagement with a bottle chimney. The clips are angulated and reversible and may be interchanged in the radially spaced slots to vary selectively the displacement of the clips from the center of the base. The clips may also be reversed for extension inside or outside the chimney thereby providing further variation in the size of chimneys that can be accepted and supported on the base. Unexpectedly, a pair of the clips functions as an efficient steadyrest for supporting a bottle as it is rotated over a flame to heat a scored area of the bottle for subsequent parting by immersion in water or by some similar thermal shock procedure.

The novel base-cutter disclosed herein provides an efficient, multifunctional glass cutter and displays compactness, ease of operation for hobbyists and low cost;

therefore, it will be appreciated that this invention is the key to a bottle lamp kit which is practical, profitable and therefore, marketable.

These and other advantages and objects of this invention and the manner of obtaining them will become apparent and the invention will be best appreciated and fully understood by having reference to the following detailed description of the embodiments of the invention taken in conjunction with the accompanying drawings.

DESCRIPTION OF THE DRAWINGS

FIG. 1 is a plan view depicting a first embodiment of the bottle lamp base and showing the partial outline of a bottle in phantom lines;

FIG. 2 is an elevation of the base shown in FIG. 1 depicting a partial chimney;

FIG. 3 is a section taken generally along lines 3—3 of FIG. 1 showing a partial chimney and an alternate position of a spring clip;

FIG. 4 is a fragmentary sectional view taken generally along lines 4—4 of FIG. 1 and partially showing in phantom lines a bottle being scored;

FIG. 5 is a perspective view of a scored bottle being heated by rotating it in the flame of a candle;

FIG. 6 is a perspective view showing a partial bottle chimney disposed upon the base depicted in FIG. 1;

FIG. 10 is a view similar to FIG. 9 showing a modified container for a candle;

FIG. 11 is a plan view of a modified form of the embodiment of the invention shown in FIG. 7;

FIG. 12 is partial section taken generally along lines 12—12 of FIG. 11; and,

FIG. 13 is an elevational view looking along lines 13—13 of FIG. 12.

DETAILED DESCRIPTION OF PREFERRED EMBODIMENTS

Figure 7:
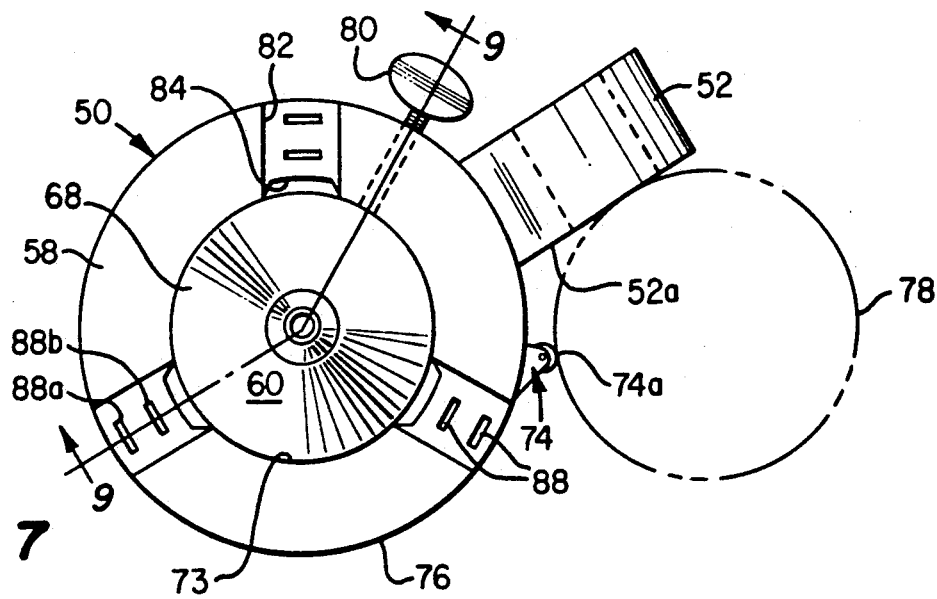
FIG. 7 is a plan view of a second embodiment of the bottle lamp base showing the outline of a bottle in phantom lines.

FIGS. 1 through 6 depict the present invention in its basic form. As best shown in FIG. 6, an annular base 20 provides a rest for an open-bottomed glass chimney 22 which has its extreme bottom surface bearing on the upper surface 24 of the base 20. The base is penetrated by a central aperture 28 which interfittingly receives a conventional candle cup 30 holding the usual candle wax 32 and a candle wick 34.

To assure an adequate supply of combustion air inside a chimney seated on base 20, the interior of the chimney 22, as best illustrated in FIG. 3, is communicated to atmosphere by means of a plurality of intersecting passages 36 and 38 through the annular body of base 20. The passages 36 may penetrate the base 20 vertically or extended downwardly into the base only sufficiently to register with the passages 38 which open laterally through the annular body of base 10 for the purpose stated above.

The base 20 has a plurality of angularly spaced recesses or slots 40 opening to the upper surface 24 of the base. The slots 40 are shaped and sized to receive a like number of spring members or clips 42 in close, interfitting relationship. Each clip 42 comprises a flat spring having a central body portion 42a and extending arms 42b and 42c which are oppositely bent with respect to the body portion. With the clip arms 42b inserted in slots 40, the clip bodies 42a extend radially outwardly toward the upright interior surface of the chimney 22 so that the clip surfaces joining the bodies 42a and the reentrant arms 42c bear against the interior chimney surface. The outwardly facing surfaces of the bent arms 42c provide guides for proper alignment of the chimney 22 as it is pressed downwardly upon clips. The bent shape of the clips 42 assures that each of the clips will be deformed slightly inwardly as the same are slidably overridden by a descending chimney. It will be understood that the clips are biased firmly against the chimney for securing the same in proper assembly upon the base 20 as depicted in FIG. 6, for example.

Preferably, the clips 42 may be removed from the slots 40 with only slight effort so that they may be rotated through 180° and reinserted in the slots 40 as shown in broken lines in FIG. 3. By this means, a chimney 22a having a substantially smaller diameter than chimney 22 can be secured on base 20 by the clips 42 in substantially the same fashion as described hereinbefore with respect to chimney 22.

Several important objects and advantages of this invention are achieved by attaching a glass cutter head 44 directly to the base 20. FIGS. 1, 2 and 4 depict a cutter head 44 embedded in the base sidewall 26 and projecting radially outwardly therefrom for cutting or scoring engagement with the upright exterior surface of a glass bottle 46. A preferred form of the head 44 closely resembles its counterpart carried at the end of a conventional handheld glass cutting tool. A relatively short cutter body 44a is received in a slot 48 extending radially through the base 20 and opening medially in the wall 26. Integral with and extending radially outwardly from the cutter body 44a are tapered and bifurcated arms 44b which are penetrated by a cross pin 44c for journaling a rotary cutter wheel 44d. The cutter head fits tightly in the slot 48 and may be fixed therein by cementing or by a removable screw or pin, not shown.

As will be more fully explained hereinafter, the bottle 46 depicted in FIGS. 1, 4 and 6 is pressed against the cutter wheel 44d and rotated about its longitudinal axis to produce an incised groove 46a about the outer wall of the bottle. The function of the phantom line spring clip 42 projecting laterally from the base wall 26 in FIG. 1 and the method and means for heating an incised bottle dipicted in FIG. 5 will also be disclosed hereinafter in detail as part of the description of the operation of the invention.

Figure 8:
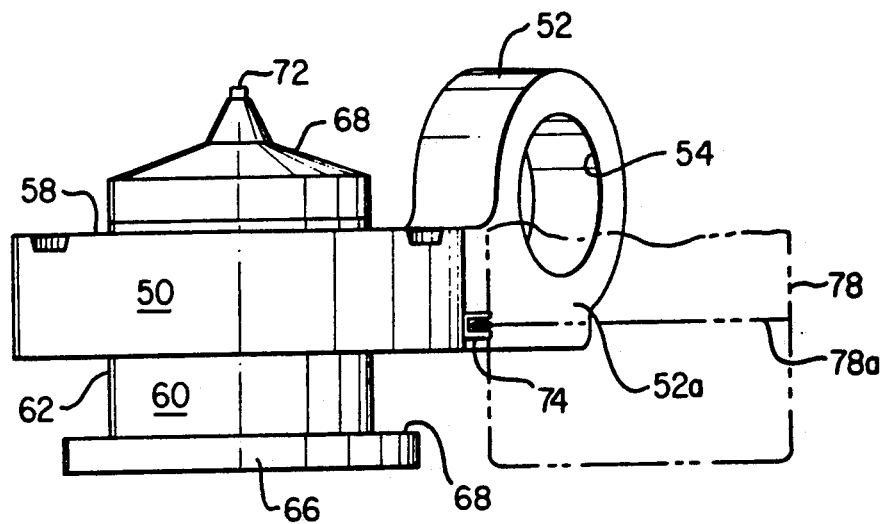
FIG. 8 is an elevation of the base shown in FIG. 7.
Figure 9:
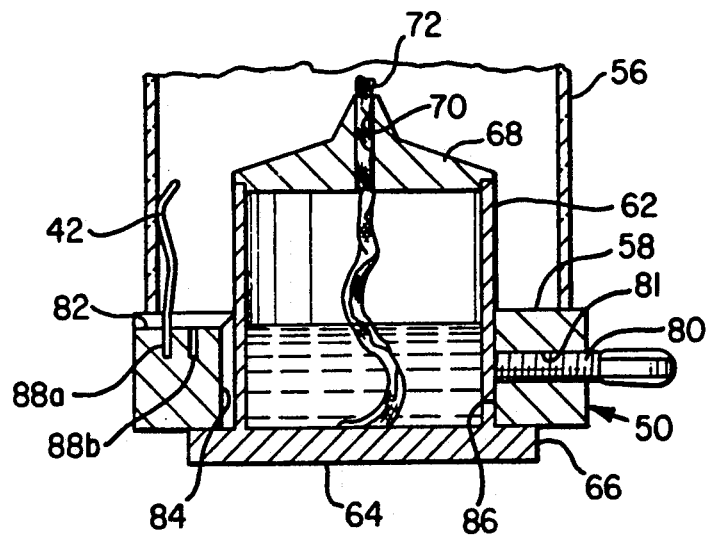
FIG. 9 is a section taken generally along lines 9—9 of FIG. 7.

Another embodiment of this invention is illustrated in FIGS. 7, 8 and 9. An annular base 50 similar to base 20, has integrally formed therewith or otherwise attached thereto a handle 52 which projects radially from the base for manual grasping. The handle 52 is conventionally shaped and has a finger-receiving aperture 54. A chimney 56 similar to chimney 22, for example, rests on the top surface 58 of the base 50 in surrounding relation to a fuel burning light unit designated in its entirety by numeral 60. The unit 60 includes a liquid fuel reservoir formed by a hollow cylinder 62 closed at its bottom by a wall 64 which extends beyond the upright wall of cylinder 62 to form a radially extending flange 66. The open upper end of the cylindrical reservoir receives a close fitting closure and refilling cap 68 having a central aperture 70 through which a wick 72 depends into the fuel contained within the reservoir. The operation of the fuel burning unit 60 is well known and need not be further described.

A central aperture 73 extending axially through the base 50 receives the cylinder 62 in close sliding engagement whereby the base is movable coaxially relative to the fuel burning light unit 60 as shown by comparing FIGS. 8 and 9. In its lowermost position relative to the cylinder 62, the base 50 rests on the underlying upper surface of the flange 66. In FIG. 8 the base has been elevated with respect to the cylinder 62 to about the vertical midpoint of the latter. It will be appreciated that the fuel unit 60 serves as a sub-base for base 50 whereby the base 50 may be positioned at a selectable distance above the surface upon which the fuel unit 60 rests.

A glass cutter head 74 like the previously disclosed head 44 projects laterally from the outer cylindrical wall 76 of the base 50 in spaced relation to the point of attachment of the handle 52 to the base. Not only does the handle 52 enhance the appearance of the lamp, but it provides a steadyrest for a bottle 78 while the latter is being scored by the cutter 74. As best seen in FIG. 7, the included angle between the handle 52 and the cutter 74 is selected so that bottles having substantially different diameters can be urged into bearing contact with both the handle side surface 52a and the cutter wheel 74a. As the bottle 78 is rotated for scoring a groove 78a in its side wall, the bottle is contained or cradled in the generally wedge-shaped opening defined between the handle 52 and the cutter head 74.

The vertical position of the incised groove 78a above the bottom of the bottle 78 may be selected by raising or lowering the base 50 about its sub-base defined by the fuel reservoir. A selfthreading thumb screw 80 penetrates the base 50, as shown in FIG. 9; and, the screw 80 is operable in a well-known manner to engage the cylindrical reservoir wall 62 to hold the base at a selected vertical height above the surface supporting the reservoir base 64 and the bottle 78.

The angularly spaced shallow notches 82 relieved in the base upper surface 58 register with shallow notches 84 relieved in the inner annular wall 86 of the base 50. These notches provide alternate passageways for combustion air to enter the bottom of the chimney 56 resting on surface 58.

The spring clips 42 utilized in the embodiment shown in FIG. 1 are also used to position and secure the chimney 56 to the base 50 as shown in FIGS. 9 and 10. However, this aspect of the present invention is further enhanced by provision of three sets of radially spaced slots 88a and 88b, best seen in FIG. 7, adapted to receive the lower end of a clip 42 as shown in FIGS. 9 and 10. In the FIG. 9 arrangement, the clips 42 are disposed in the outer slots 88a while FIG. 10 shows the same clips positioned in the inner slots 88b. In both cases, the clips 42 may be reversed in the manner shown in FIG. 1 in solid and phantom lines so that a chimney may be seated radially inside or outside of the same set of clips, also as illustrated in FIG. 1. From the foregoing, it will be appreciated that a single set of three clips 42 may be interchanged in slots 82a and 82b and reversed within each set of slots to secure chimneys of substantially different diameters upon lamp base 50.

A modification of the fuel burning version of the invention just described is illustrated in FIG. 10 wherein the closure cap 68 and the wick 72, shown in FIG. 9, have been removed from the interior and top of the reservoir. Instead, a candle cup 90 having therein a candle 92, shown in phantom lines, is received in the open upper end of the cylinder 62. The cup 90 has an enlarged annular rim 94 at its upper end which rests upon the extreme upper end surface of the cylinder 62 for supporting the cup in the reservoir. The thumbscrew 80 may be urged against the outer cylindrical wall of the cup 90 to secure the same within the cylinder 62. Preferably, the diameter of the cylinder 62, whether employed as a fuel reservoir or as a receptacle for the candle cup 90, is selected to accommodate a commercially available candle cup of standard size.

As stated hereinabove, an important functional feature of this invention is the provision of a lamp base mounted bottle cutter which is adjustably movable with respect to the base for perpendicular engagement with curved or sloped bottle walls of the type shown in FIG. 13, for example. For this purpose the aforedescribed embodiment shown in FIGS. 7, 8 and 9 has been modified by mounting a glass cutter head 100 in a handle 102 which is attached to the base 50 as shown in FIGS. 11, 12 and 13. Otherwise the structure of this modification follows that of the last described embodiment. FIGS. 11 and 13 show the cutter head 100 projecting laterally from a handle side wall 104 in which the head may be secured in a manner similar to that described above in regard to the cutter head 44. As best illustrated in FIG. 12, the handle 102 and the base annulus 50 comprise separate parts held together by an elongated threaded fastener 106 which penetrates aligned bores 108 and 110 in these parts. An anchoring device 112, such as a nut, is completely received in the inner cylindrical wall 86 of the base 50 for threadably engaging the inner end of the fastener 106 as the latter is rotated by means of the projecting wings 114 at its outer end.

In the event it becomes desirable to move the cutter blade 100a to a position other than horizontal, the fastener 106 is rotated to loosen the handle 102 for tilting about the longitudinal axis of fastener 106. The handle is then rotated clockwise, as viewed in FIG. 13, and the fastener 106 is retightened to compress the handle and cutter head together thereby locking the latter at the desired angle whereby the cutter blade 100a will engage the curved surface of the glass bottle 116 at a right angle for maximum cutting efficiency.

With the cutter head 100 mounted on the handle 102 for the purpose just described, the bottle 116 to be scored is positioned with its upright wall in bearing engagement with the outer cylindrical wall 76 of the base as well as the cutter wheel 100a. A comparison of FIGS. 7 and 11 reveals that the earlier stated objective of employing a portion of the lamp base itself as a steady rest for a rotating bottle wall is achieved in both embodiments of the invention. However, the location of the cutter head has been changed in FIG. 11 to permit angular adjustment thereof.

The annular lamp bases 20 and 50 may be fabricated from any suitable materials such as light weight metal, wood or plastic. If the base is molded of plastic, it can be colored and surface textured to give the appearance of wood while exhibiting light weight and great durability. The chimney clips 42 are made of a suitable spring material. A plastic having resistance to liquid fuels commonly used in lamps and having good heat resistance may be employed for molding the components of the fuel burning light unit 60. The fasteners 80, 106 and 112 are standard hardware items which are readily available at low cost.

OPERATION OF THE EMBODIMENTS

To sever the bottom portion of a bottle by means of the basic base-cutter combination shown in FIGS. 1 and 4, the base 20 is positioned on the same plane surface with a selected bottle 46. An operator may conveniently hold the base in this fixed position with one hand while grasping the bottle in the other. The side wall of the bottle is then simultaneously pressed against the cutter wheel 44d and an adjacent point along the upright wall 26, as shown in FIG. 1, with sufficient force to form a groove or score line 46a in response to rotation of the bottle relative to the base 50. With little skill and effort, a hobbyist can produce a perfect score line through the utilization of this simple yet effective device. While the base sidewall itself provides a satisfactory steadying means for a rotating bottle, better results can be sometimes obtained by temporarily using one of the chimney clips 42 for this purpose. Thus, a slot 120 can be formed in the base 50 to open radially outwardly at a point along the base wall 26 displaced angularly from the projecting cutter wheel 44d. One end of a clip 42 is fitted into the slot 120 whereby the projecting portion of the clip can be engaged by the bottle wall as a guide and stabilizing rest. To locate the score line 46a above or below the position shown in FIG. 4, the base 20 and the bottle can be supported on separate surfaces at different elevations.

After scoring the bottle 46, the base components are assembled by pressing the candle cup 30 and the chimney support clips 42 into the central aperture 28 and the slots 40, respectively. In the state of assembly shown in FIG. 5, the base provides an efficient support for the bottle as the latter is heated in the area of the score line 46a by rotating the bottle over the flame of the candle 30. This advantageous use of the lamp candle as a heat source for parting the bottle by means of thermal shock and the lamp clips as a bottle steadyrest greatly simplifies this task for a hobbyist since no tools or materials are required beyond the base itself and the heating operation involves no more than grasping and turning the neck of the bottle. The bottom portion of the bottle may be parted by thermal shock produced by rapid cooling of the heated score line in cold water.

After the bottle 46 has been severed to remove its bottom portion or both its top and bottom portions, as desired, the remaining bottle portion provides a specially crafted chimney which sits upon base 20 in the manner shown in FIG. 6. The bent shape of the spring clips and the ease with which they can be reversed in their receiving slots 40 insure that the clips will resiliently press against either the inside or outside wall of any chimney varying in diameter as much as do the chimneys 22 and 22a shown in FIG. 3. If the bottle used as a chimney has a narrow neck or if a stopper or cap is affixed at the top end of the chimney, the intersecting passages 36 and 38 through the base 20 will supply combustion air to the candle flame.

After the chimney is completed, the cutter head 44 may be removed from the base 20 or left in place, as desired. Neither the shape or the size of the head detracts significantly from the appearance of the finished lamp. Furthermore, the cutter can be used repeatedly to fabricate other bottle chimneys for the same or different bases.

It will be appreciated by those familiar with bottle lamp crafting that a novel base providing the aforedescribed features which so greatly simplify and facilitate bottle chimney fabrication can be combined with a set of chimney supporting clips 42 and one or more candle cups 30 to make a highly marketable bottle lamp craft kit. These relatively small and simple kit components can be economically made or purchased, easily explained, and compactly and neatly packaged. Obviously, the crafter who purchases such a kit will supply a bottle of his choice to be crafted as a novel lamp chimney.

The embodiment of the invention shown in FIGS. 7 through 10 is characterized by vertical adjustability of the cutter head. The cylinder 62 and wall 64 closing the bottom of the cylinder comprise a sub-base about and along which the cutterbase 50 is vertically shiftable. FIG. 8 depicts a bottle 78 and the sub-base resting on a common plane. To vary the distance of the incised groove 78a above this plane, the operator merely loosens the thumbscrew 80 and thereafter moves the base 50 and cutter 74 up or down along the cylinder 62 as desired. The limits of such vertical cutter adjustment are substantially as shown in FIGS. 9 and 10. Between these limiting positions, the cutter head can be positioned with great accuracy by placing a gage block or the like between the bottom surface of the base 50 and the top surface of the annular flange 68.

The inclusion of the fuel burning light unit 60 with the previously described bottle lamp kits expands the user's choice of brilliance and life of the light source. If a lamp were to be made for commercial use in a lounge or restaurant for example, the light intensity and mood could be selected by the choice of color and hue in the chimney glass. The ability to modify the fuel unit 60 by changing it to a candle unit, as illustrated in FIG. 10, provides other opportunities for crafters to utilize shapes and colors to complement such a low intensity light source.

Finally, the modified version of this invention shown in FIGS. 11, 12 and 13 is intended to afford even beginning bottle crafters opportunities to use bottles having walls that are not uniformly straight and perpendicular to the bottle bottom. One such bottle 116 is shown in FIG. 13 wherein the cutter blade 100a has been angled upwardly from horizontal to engage and incise the curved bottle wall at as nearly a right angle as possible. Such scoring of the bottle is most efficient with the blade addressing the bottle surface in this manner. This required degree of operational sophistication in the simple device disclosed herein is afforded by the evolution of the basic annular base 20 through the steps of adding the handle 52 as a steadyrest, moving the cutter head 100 to the handle 102, and then making provision for angular tilting of the handle 102 and cutter head 100 relative to the base 50. Finally, mounting the base 50 on the fuel unit 60 in the manner described herein provides for vertical adjustment of the blade 100a in addition to the angular adjustment afforded by tilting handle 102.

The foregoing description of the embodiments of the invention shown in the drawings is illustrative and explanatory only; and, various changes in the size, shape and materials, as well as in specific details of the illustrated construction, may be made without departing from the scope of the invention. Therefore, we do not intend to be limited to the details shown and described herein, but intend to cover all changes and modifications which are encompassed by the scope and spirit of the appended claims.

What we claim as our invention is:

1. In a base for supporting glass chimney means, a row of angularly spaced openings in said base having disposed therein a plurality of reversible spring members each having one end portion inserted in an opening and the opposite end portion projecting from said base for engagement with said chimney.

2. The base according to claim 1, wherein at least another row of angularly spaced openings is radially spaced from said first row; and,
    said spring members are interchangable between the openings of the respective rows.

3. In a base for supporting glass chimney means:
    glass cutting means projecting from said base for cutting a glass chimney means;
    a row of angularly spaced openings in said base; and,
    plural spring members each having one end portion reversibly mountable in said openings and an opposite end portion projecting from said base for supporting engagement with said chimney means.

4. The base defined in claim 3, wherein at least another row of angularly spaced openings is radially spaced from the first mentioned row; and,
    said spring members are interchangable between the openings of the respective rows.

5. A lamp base adapted to cut the bottom from a bottle whereupon said bottle has an annular extreme bottom end surface, said base comprising:
    upper and lower surfaces extending transversly with respect to an upright exterior wall surface;
    said upper surface having an annular rest surface contacting said annular extreme bottom end surface of said bottle and supporting said bottle uprightly thereupon; and
    glass cutting means mounted on said upright exterior wall surface between said upper and lower transverse surfaces and projecting transversly therefrom for cutting said bottle.

6. The lamp base according to claim 5, wherein:
    said upright exterior wall surface comprises a complete cylindrical surface intersecting said upper and lower surfaces.

7. The lamp base according to claim 5, wherein:
    an integral portion of said upright exterior wall surface is angularly displaced from said glass cutting means and provides a steadying surface for a bottle being cut by said glass cutting means.

8. The lamp base according to claim 5, wherein:
    a manual handle grip projects from said base and provides a steadying surface for a bottle being cut by said glass cutting means.

9. The lamp base according to claim 5, wherein:
    a flat member having one end thereof disposed in an opening in said upright exterior wall surface and projecting outwardly therefrom provides a steady rest for a bottle being cut by said glass cutting means.

10. A bottle lamp comprising a lamp base, a bottle modified by cutting the closed end therefrom to form a bottle chimney having an open end defining the extreme bottom end surface of said chimney, and a light source, wherein:
    said base has upper and lower surfaces extending transversly with respect to an upright exterior wall surface;
    said upper surface defines a chimney rest surface contacting said extreme bottom end surface of said chimney to carry said chimney above said upper surface;
    glass cutting means mounted on said base between said upper and lower surfaces and projecting laterally from said wall surface for cutting said closed end from said bottle; and,
    said base defines within said chimney rest surface a support for said light source.

11. The bottle lamp according to claim 10, wherein:
    said light source is supported within a bore opening to said upper surface.

12. A base for supporting a light source and glass chimney means, including:
    a manual handle grip projecting from said base;
    glass cutting means carried by said manual handle grip for cutting glass chimney means; and,
    surface means spaced from said glass cutting means in bearing contact with chimney means being cut by said glass cutting means.

13. The base defined in claim 12, wherein:
    said manual handle grip is selectively movable with respect to said base.

14. The base defined in claim 13, wherein:
    said manual handle grip tilts angularly with respect to said base and chimney means being cut by said glass cutting means.

15. A base for supporting a light source and glass chimney means, including:
    glass cutting means carried by said base in projecting relation thereto for cutting glass chimney means; and,
    said base carries said light source about which said base in relatively shiftable to move said glass cutting means with respect to said light source.

16. The base defined in claim 15, wherein:
    said light source includes a cylindrical fuel reservoir about which said base is relatively shiftable.

17. The base defined in claim 16, wherein:
    said reservoir supports a candle.

* * * * *